(12) United States Patent
Curry

(10) Patent No.: US 9,988,291 B2
(45) Date of Patent: Jun. 5, 2018

(54) FLOATING TREATMENT BED FOR PLANTS

(71) Applicant: Michael Francis Curry, Winnipeg (CA)

(72) Inventor: Michael Francis Curry, Winnipeg (CA)

(*) Notice: Subject to any disclaimer, the term of this patent is extended or adjusted under 35 U.S.C. 154(b) by 0 days. days.

(21) Appl. No.: 15/176,418

(22) Filed: Jun. 8, 2016

(65) Prior Publication Data

US 2018/0118595 A1    May 3, 2018

Related U.S. Application Data

(62) Division of application No. 14/090,894, filed on Nov. 26, 2013, now Pat. No. 9,394,190.

(60) Provisional application No. 61/729,770, filed on Nov. 26, 2012.

(51) Int. Cl.
| | |
|---|---|
| *C02F 3/32* | (2006.01) |
| *A01G 1/00* | (2006.01) |
| *A01G 9/02* | (2018.01) |
| *C02F 7/00* | (2006.01) |
| *A01G 31/02* | (2006.01) |
| *A01D 44/00* | (2006.01) |
| *C02F 101/10* | (2006.01) |

(52) U.S. Cl.
CPC .............. *C02F 3/327* (2013.01); *A01D 44/00* (2013.01); *A01G 1/007* (2013.01); *A01G 9/02* (2013.01); *A01G 31/02* (2013.01); *C02F 7/00* (2013.01); *C02F 2101/105* (2013.01); *Y02A 40/228* (2018.01); *Y02P 60/216* (2015.11); *Y02W 10/15* (2015.05); *Y02W 10/18* (2015.05); *Y02W 10/37* (2015.05)

(58) Field of Classification Search
CPC ...... C02F 3/327; C02F 7/00; C02F 2101/105; A01G 31/02; A01G 1/007; A01G 9/02; A01D 44/00; Y02W 10/15; Y02W 10/18; Y02W 10/37; Y02A 40/228; Y02P 60/216
USPC ... 210/602, 170.06, 170.01, 170.1, 903, 906
See application file for complete search history.

(56) References Cited

U.S. PATENT DOCUMENTS

| | | |
|---|---|---|
| 3,768,200 A | 10/1973 | Klock |
| 4,312,152 A | 1/1982 | Drury et al. |
| 4,536,988 A | 8/1985 | Hogen |
| 5,320,663 A | 6/1994 | Cunningham |
| 5,324,657 A | 6/1994 | Tanny |
| 5,337,516 A | 8/1994 | Hondulas |
| 6,322,699 B1 | 11/2001 | Fernandez |
| 8,940,161 B2 | 1/2015 | Kyrzak |

(Continued)

FOREIGN PATENT DOCUMENTS

| | | |
|---|---|---|
| JP | 9029283 | 2/1997 |
| WO | 9636568 | 11/1996 |

*Primary Examiner* — Fred Prince
(74) *Attorney, Agent, or Firm* — Adrian D. Battison; Ade + Company Inc.; Ryan W. Dupuis

(57) ABSTRACT

Contaminating material is extracted from a body of water by providing a floating bed on which plants such as Cat Tails can be grown with their roots hanging into the body of water over an area where extraction of contaminating material from the body of water is required, growing the plants to take up the contaminating material from the body of water and harvesting the upstanding plant mass by moving the bed to a harvesting machine which cuts away the plant mass leaving at least part of the root mass to continue growing into a new season. The bed can be returned to a location for the next season.

18 Claims, 7 Drawing Sheets

(56) References Cited

U.S. PATENT DOCUMENTS

| | | |
|---|---|---|
| 2005/0044788 A1 | 3/2005 | Tang et al. |
| 2009/0139927 A1 | 6/2009 | Kania et al. |
| 2010/0319248 A1* | 12/2010 | Reyankar Krishna Prasad .................... B63B 35/44 47/48.5 |
| 2011/0259820 A1 | 10/2011 | Songer et al. |
| 2012/0228216 A1 | 9/2012 | Gavrieli |

* cited by examiner

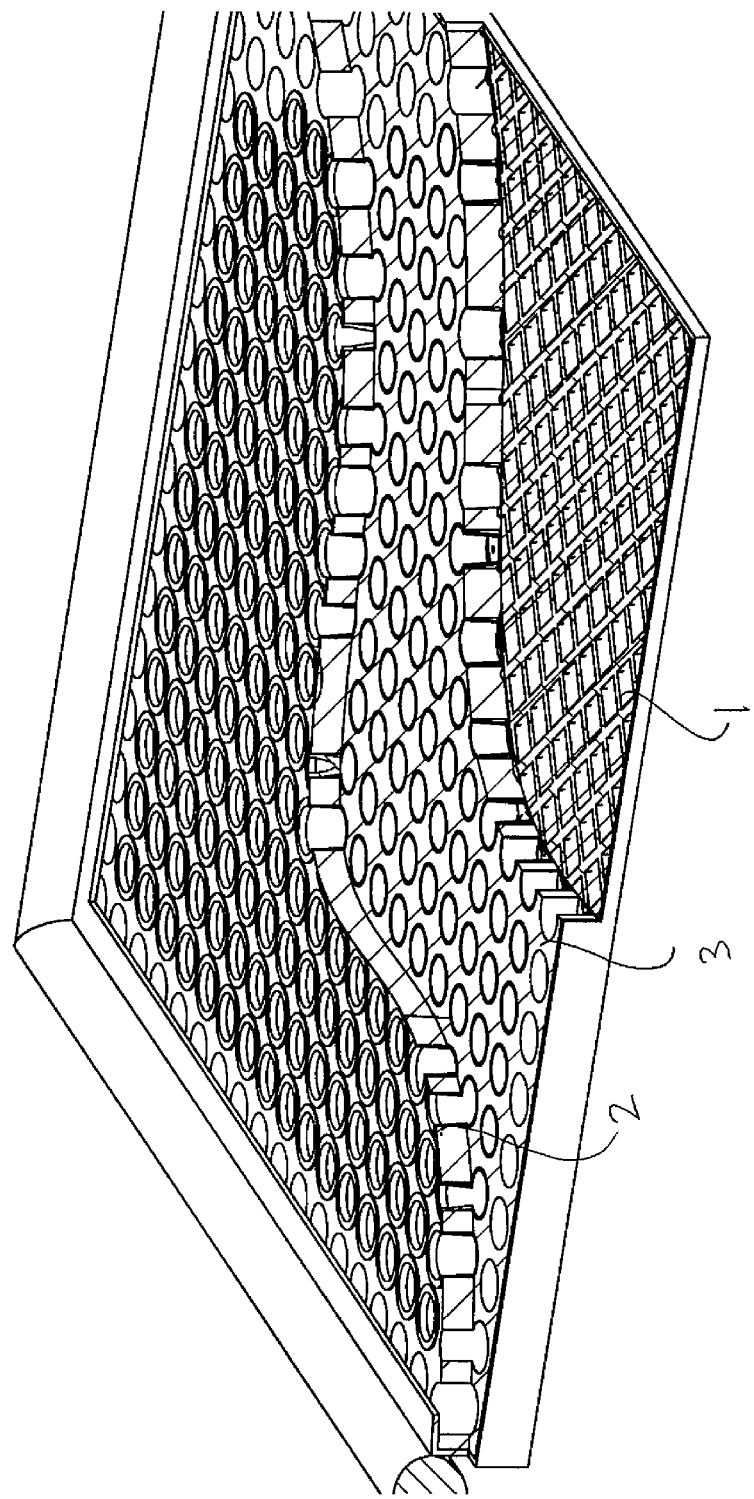

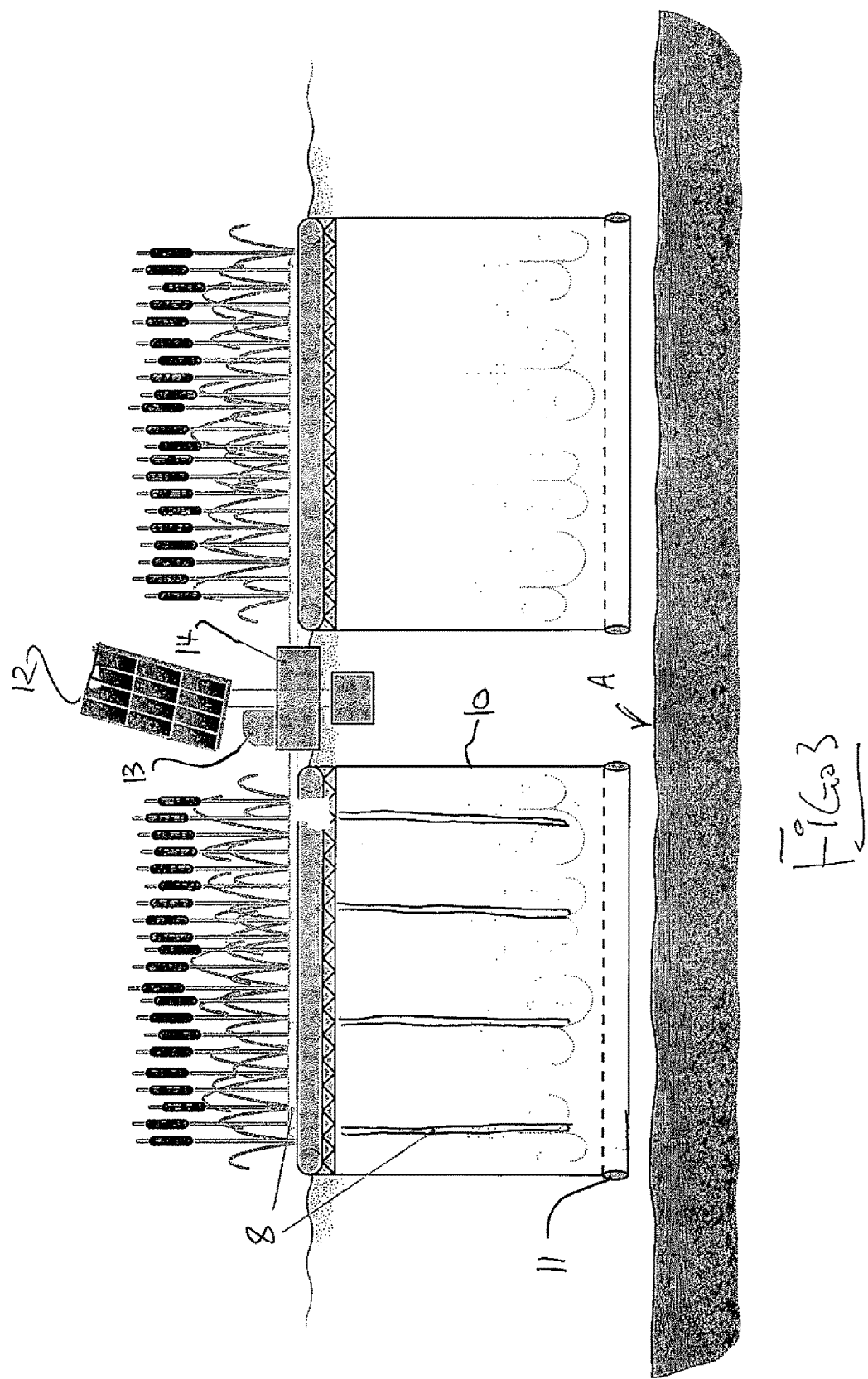

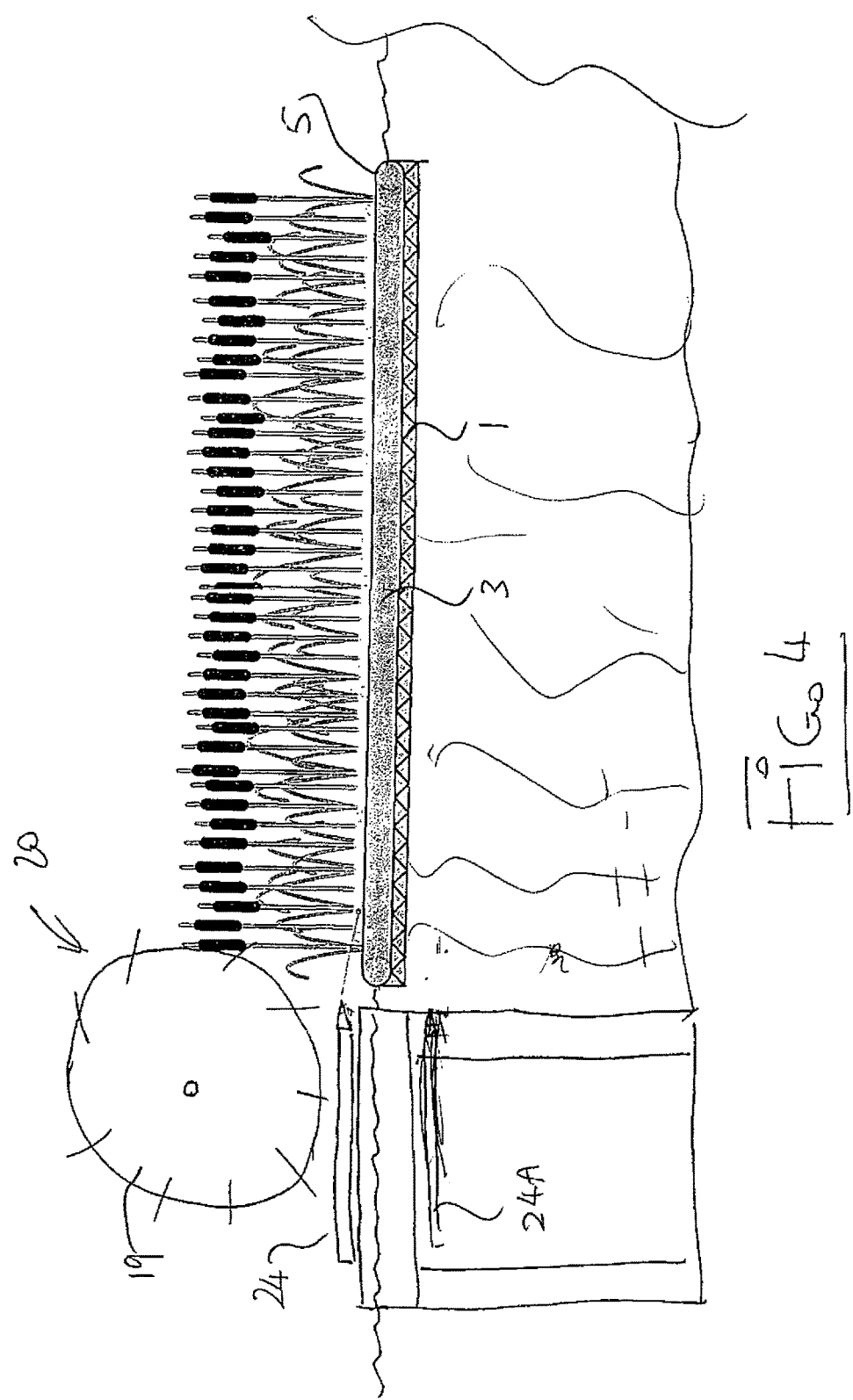

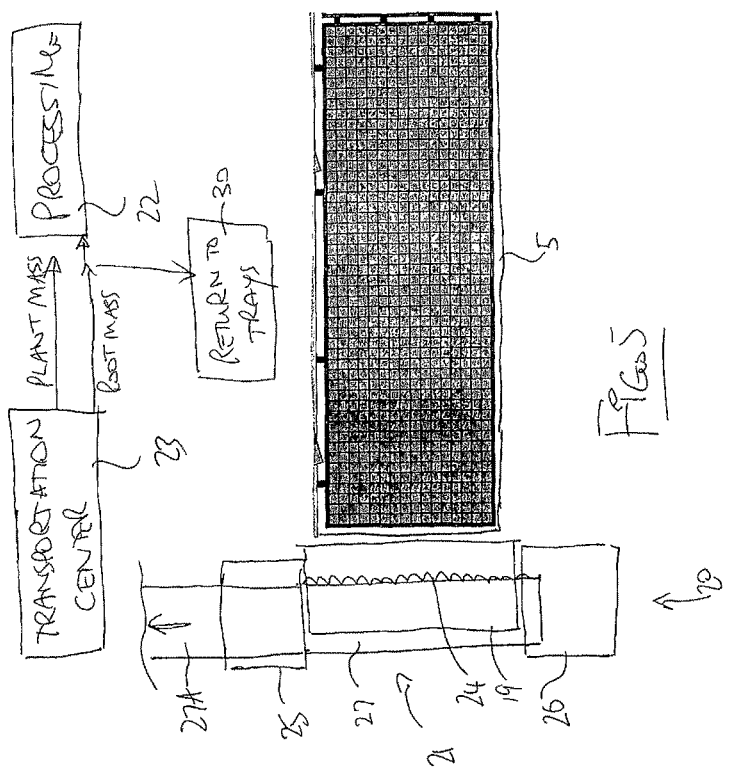

FLOATING TREATMENT BED FOR PLANTS

This application is a Divisional application of US parent application Ser. No. 14/090,894 filed Nov. 26, 2013, which claims the benefit under 35 USC 119 (e) of Provisional Application 61/729,770 filed Nov. 26, 2012. This invention relates to a method for extraction of contaminating material from a body of water.

BACKGROUND OF THE INVENTION

It has been proposed to grow plants on floating areas where the plants are supported on a flotation pad with their roots hanging into the water. However many difficulties and issues remain unsolved.

The following patents have been noted in this field: Japanese patent 9-29283 is an early attempt to treat water using a floating biomass.

U.S. Pat. No. 5,337,516 Hondulas is a land based system of high complexity where the roots hang in the water.

U.S. Pat. No. 6,322,699 Fernandez provides an arrangement in which waste water is treated using the general idea of using large plants grown on a floating mass with their roots hanging to clear water. The patent is not however filed in Canada.

US Published application 2012/0228216 Gavrieli is a recent application for a structure which floats and carries sheets on which microplants are carried. This uses agitation or aeration systems using power to drive them.

Published PCT application WO96/36568 discloses a method of extracting metals from water using hanging plants.

All publications, patents, and patent applications mentioned in this specification are herein incorporated by reference to the same extent as if each individual publication, patent, or patent application was specifically and individually indicated to be incorporated by reference.

Plants suitable for the method herein can be of the type Typha, genus of about eleven species of monocotyledonous flowering plants in the family Typhaceae. The genus has a largely Northern Hemisphere distribution, but is essentially cosmopolitan, being found in a variety of wetland habitats. These plants are conspicuous and hence have many common names. They may be known as bulrush, or reedmace, and as cattail, catninetail, punks, or corn dog grass.

These plants grown in wetlands at the edges of lakes are known to carry out extraction of phosphates and other contaminants as these materials are taken up by the roots and thus absorbed into the plant. However this natural process has been lost due to the reduction in areas of wetland. Also the amount of phosphates and similar contaminants has much increased leading to a serious contamination of many lakes with the potential for environmental disasters.

In regard to one lake in Manitoba which is Lake Winnipeg, much of the emergent vegetation in the Netley-Libau Marsh has been lost over the past several decades. Consequently, any removal of the nutrients in the Red River that would formerly have been intercepted by those plants has also been lost. The water in much of the Netley-Libau Marsh is too deep (>1 meters) for plants to re-establish naturally.

Attempts have been made for new areas of growth to be established on artificial islands. However the construction of artificial islands for plant colonization in Netley-Libau Marsh would be costly and the investment would be lost if these islands are later found not to provide suitable habitat. If they do work, the practical use of vegetation growing on these islands would require the invention of amphibious equipment to harvest and transport the plants to land for processing (for biofuel and nutrient extraction benefits).

SUMMARY OF THE INVENTION

It is one object of the invention to provide a method for extraction of contaminating material from a body of water.

According to one aspect of the invention there is provided a method for extraction of contaminating material from a body of water comprising:

forming a floating bed on which terrestrial plants can be grown with their roots hanging into the body of water;

locating the floating bed over an area where extraction of contaminating material from the body of water is required;

growing the terrestrial plants so as to form a root mass in the water and an upstanding plant mass;

growing the terrestrial plants to take up the contaminating material from the body of water;

and harvesting the upstanding plant mass leaving at least part of the root mass to continue growing into a new season;

wherein there is provided a step of agitating a bed of the body of water in the area of the floating bed to lift the contaminating material to the roots;

wherein equipment used for agitation is positioned into the water from the floating bed which is arranged at a water surface such that the floating bed where the terrestrial plants are grown thereon is in spaced relation above the bed of the body of water which includes sediment containing contaminating material.

Preferably there is provided a power source carried on a support portion of the floating bed that powers the equipment for agitation locally at the location of the floating bed.

The equipment used for agitation may depend from locations along a periphery of the floating bed.

Preferably the floating bed comprises a plurality of growth trays connected together.

Preferably each growth tray comprises a plurality of plant carrying trays shaped to fit into the openings in the foam with each plant carrying tray being pre-germinated and applied onto the foam at installation on the body of water.

Preferably each plant carrying tray has the cups thereof covered by a layer of a transparent film.

Preferably the transparent film is slit at a location of the respective cup to form an opening to allow plant growth through the transparent film while the transparent film remains arranged to encourage germination of the respective plant by greenhouse effect within the respective cup.

According to one aspect of the invention there is provided method for extraction of contaminating material from a body of water comprising:

forming a floating bed on which plants can be grown with their roots hanging into the body of water;

locating the floating bed over an area where extraction of contaminating material from the body of water is required;

growing the plants so as to form a root mass in the water and an upstanding plant mass;

growing the plants to take up the contaminating material from the body of water;

and harvesting the upstanding plant mass leaving at least part of the root mass to continue growing into a new season.

Preferably the contaminating material is phosphate in lake water.

Preferably the lake bed in the area of the floating bed is agitated to lift the contaminating material to the roots.

Preferably the bed is agitated by aeration.

Preferably the bed is agitated by pumping water.

Preferably the bed is agitated by stirring the water by a propeller or the like.

Preferably the floating bed has a skirt arranged around the periphery hanging from the water to a position at or adjacent the lake bed.

Preferably the skirt is removable for moving the floating bed from the location to a new location.

Preferably the floating bed is moved from the location to a harvesting location and is returned to a location which may be the same or different location for further operation.

Preferably there is provided a support portion for a power source to operate the agitation.

Preferably the power source is solar panels.

Preferably the power source drives a pump for air or water.

Preferably a plurality of floating beds is connected together.

Preferably the floating beds are connected together and provide support between them for the power source.

Preferably each floating bed is towed to a harvesting location and passed through a harvesting machine for cutting the plant mass and transporting the plant mass from the bed to a processing location. However it is also possible that a floating harvesting machine is moved to the floating beds.

Preferably the harvesting machine includes a sickle knife and wherein the floating bed passes underneath the knife.

Preferably the harvesting machine includes a rotating reel for pulling the crop mass into the machine.

Preferably the harvesting machine includes a conveyor belt for carrying the plant mass along the machine to the processing location.

Preferably the harvesting machine is mounted on a fixed support in the lake for passing the floating bed past the machine.

Preferably the floating bed has a width in the range 10 feet to 30 feet so as to be maneuverable on the body of water.

Preferably the floating beds are connected together with a peripheral flotation element.

Preferably the floating bed comprises a plurality of growth trays connected together.

Preferably each growth tray comprises a layer of foam with cup shaped openings for receiving individual plants.

Preferably each growth tray includes a mesh above and/or below the foam layer.

Preferably each growth tray comprises a plurality of flotation members such as tubes below the foam layer.

Preferably each growth tray comprises a peripheral containing member of for example a mesh material.

Preferably each growth tray comprises a plurality of plant carrying trays shaped to fit into the openings in the foam with each plant carrying tray being pre-germinated and applied onto the foam at installation on the body of water.

Preferably each plant carrying tray is formed of a bio-degradable material such as peat moss.

Preferably the growth trays are connected together to form the floating bed by ties.

Preferably a part of the root mass also is harvested at the harvesting machine and transported from the bed to a processing location. In this situation a part of the harvested root mass is used for cuttings in a new bed. The part of the harvested root mass is preferably harvested by a cutting blade underneath the bed.

Preferably each plant carrying tray has the cups thereof covered by a layer of a transparent film.

A new method has therefore been presented to create a bio-platform to streamline the process of growing the cattails for subsequent harvesting.

The concept is to plant cattail plugs into floating trays to be positioned in a larger floatation frame. The bio-platform is then deployed in the marsh and when fully grown towed back to the shoreline for harvesting. The frames are guided under stationary harvesting equipment and a conveyor belt moves cattail cuttings to storage bins on land. Once the harvest is complete the frames are returned to the marsh for continued plant growth. The system can be in place year-round except during brief periods of harvesting.

The bio-platform comprise a floating structure containing sufficient bed material to foster the initial growth of hybrid cattails (*Typha×glauca*) until the plants become well-established and self-supporting.

The bio-platforms are sufficiently rugged that they survive ice movement during the spring thaw; wave action; damage from exposure to ultraviolet light, animals, and vandalism; and accumulation of increasing plant mass over time. Individual bio-platforms can be linked together in various configurations at the deployment site, relative to prevailing water currents and winds, to provide maximum stability and longevity.

The bio-platforms can provide additional benefits: 1) they may help to dissipate waves and promote long-term sediment accretion that enables natural re-vegetation to occur, 2) they may provide habitat for wildlife and fish in the areas of deployment, and 3) they may provide a vehicle for public education and engagement about wetland restoration, especially during harvesting periods.

Bioplatforms can be deployed in a wide variety of places where plant growth is presently infeasible due to excess water depth, such as along rivers and lake inshore areas.

BRIEF DESCRIPTION OF THE DRAWINGS

One embodiment of the invention will now be described in conjunction with the accompanying drawings in which:

FIG. 1C is an isometric view of the floatation tray of FIG. 1A.

FIG. 2 is a top plan view of four floatation beds connected together for common operation on a body of water.

FIG. 3 is a front elevational view of the floatation beds of FIG. 2

FIG. 4 is a side elevational view of a harvesting machine for collecting the plant mass from a floatation bed.

FIG. 5 is a top plan view of the harvesting system of FIG. 4.

In the drawings like characters of reference indicate corresponding parts in the different figures.

DETAILED DESCRIPTION

Figure 1A:
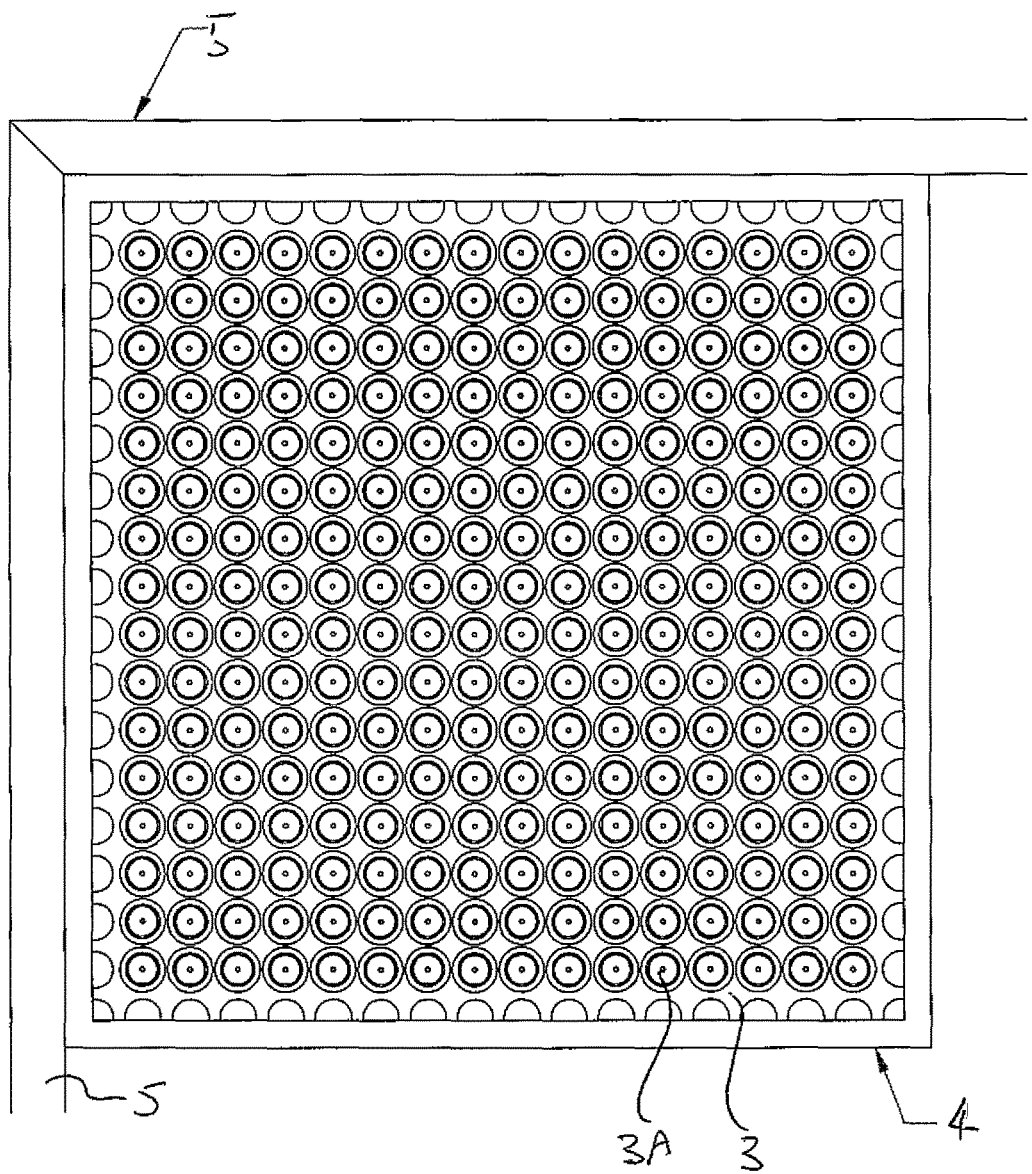
FIG. 1A is a plan view of a floatation tray for a floating bed for using the present invention.
Figure 1B:
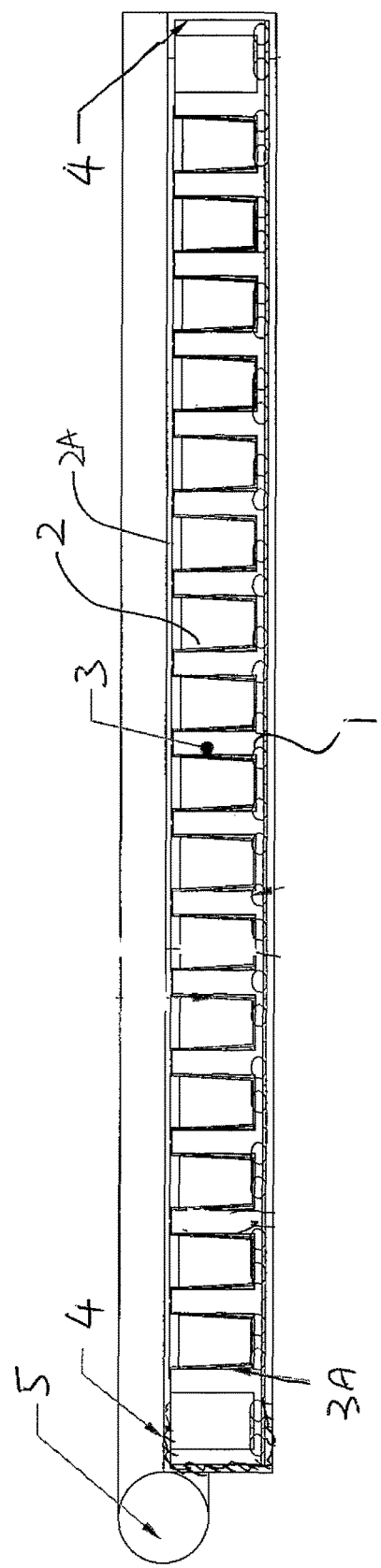
FIG. 1B is an isometric view of the floatation tray of FIG. 1A.
Figure 6:
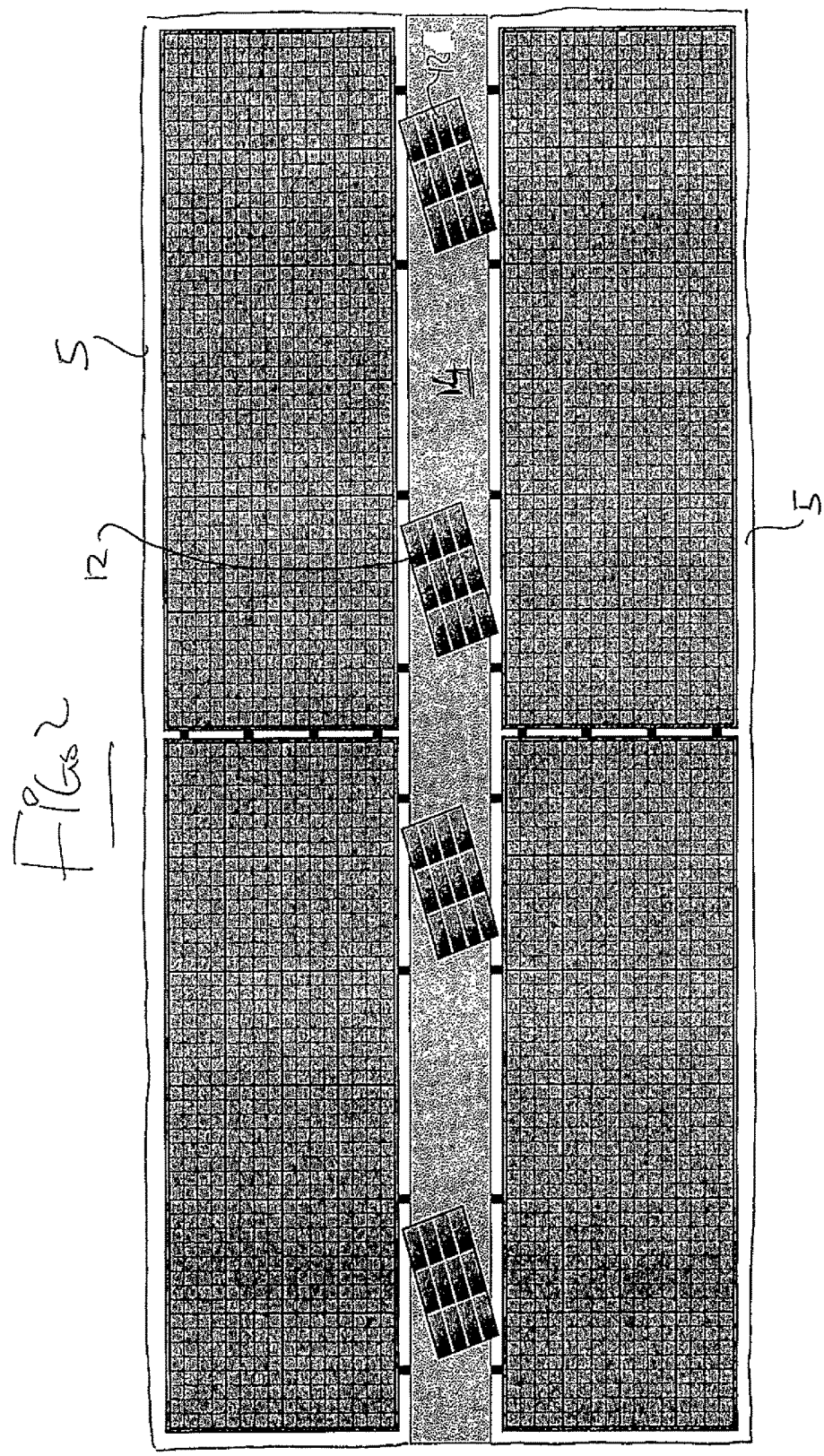

The flotation bed of FIGS. 1A, 1B, 1C, 2 and 3 includes the following components:

A heavy plastic square grid or mesh 1 for stabilizing peat tray 2 for cattail plugs grown in a greenhouse.

Polyethylene foam pad 3 with an array of cup-shaped pockets to contain peat plug tray.

Side frame 4 of preformed rigid inwardly facing C-channel.

Polyethylene pipe 5 with end capped for buoyancy.

Compressed air line 8.

Polyethylene pipe seal air tight for floatation frame 9.

Skirt 10 attached to contain aerated sediment and water.

Anchoring pocket 11 for weight chain to hold skirt down.

Solar panel 12 for power source for air pump.

Air compressor pump 13.

Floating dock or support 14 to hold solar panel and air pump.

Pipes 5 act as a float grid system to stabilize the bottom of foam containing the peat trays 2 holding the germinated plug. The stabilizer frame 4 is for tray support from heavy wave action and moderate movement with clustered trays within the floating perimeter frame 5.

The mesh 1 is the plastic grid for additional support of the foam pad for holding the peat trays 2 level. More importantly the grid is where the roots of cattail will grow through and anchor to the float tray naturally.

Foam pad 3 is the foam tray floatation made from polyethylene foam with cavities r cups 3A the shape of the peat trays 2 to accept the germinated cattail plugs in each cavity. This prevents the peat tray from sinking into the water. The cattail seedlings are initially grown in the peat tray 2 in a greenhouse. Once matured the plugs in the peat trays are introduced to the floating tray for growing outdoors.

However as an alternative the tray containing the seeds and some soil can be stored remotely and then supplied to the platform for assembly on site whereupon the seeds germinate when they come into contact with the water.

An additional plastic grid (not shown) can be is positioned on top of the peat trays 2 to prevent the trays from moving off the polyethylene foam support from wave action, wind and other movement actions from the floatation frame.

The preformed heavy plastic grid channel 1 is designed to encapsulate the multi-layer substrates edges from parting during movement. Once the cattail roots grow and cluster the bio-platform will float naturally.

The trays are assembled in the polyethylene pipe area 5 to contain multi planted grow trays. This poly pipe also acts as a compressed air storage tank fed by the air compressor pump 13. Around the perimeter of the polyethylene pipe 5, compressed air line is positioned into the water to activate the sediment bed to move phosphorus into the direction of the cattail root above. The skirt 10 is for the containment of the agitated sediment for vigorous root absorption. Anchoring chain 11 is used to keep the 10 skirt firm and taut during movement of bio platform and wave action. The whole floating dock is anchored in the body of water and holds the Bio Platforms in position during grow season which are then detached for harvesting. It also acts as a platform for support equipment including solar panels 12 and compressed air pump 13.

The apparatus shown is thus used in a method for extraction of contaminating material from a body of water. The apparatus provides the floating bed on which plants are grown with their roots hanging into the lake water. The floating bed is located over an area A of the lake bottom where extraction of contaminating material from the lake bottom is required. The plants are grown on the floating bed so as to form a root mass in the water and an upstanding plant mass. The plants are grown so that the plants take up the contaminating material from the lake bottom. The upstanding plant mass is harvested in the machine of FIGS. 4 and 5 leaving the root mass to continue growing onto a new season.

In order to increase the amount of contaminants extracted from the bottom, the lake bottom and water in the area of the floating bed is agitated to lift the contaminating material to the roots. The bottom and the water at the bottom can be agitated by aeration, by pumping water or by stirring the water by a propeller or the like. The elements necessary to effect this agitation are driven by power from the solar cells. As the growing season is long, the agitation does not need to be continuous so that if can occur only when sufficient power is available. In order to contain the agitation action and to contain the agitated water, the floating bed has the skirt 10 arranged around the periphery hanging from the water to a position at or adjacent the lake bed and held down by the weight chain 11.

As shown in FIG. 4, the skirt 10 is removed for moving the floating bed from the location to a new location including the harvesting machine 20. After harvesting, the floating bed is moved from the harvesting location and is returned to an operating location which may be the same or different location for further operation.

The individual floating beds are connected together simply by plastic ties to form an island defined by a plurality of floating beds connected together. The connection includes panels 14 between the beds which act as support between them for the power source, pump etc. The flotation tube 5 extends around the full periphery of the connected beds.

During harvesting as shown in FIGS. 4 and 5, each floating bed is separated from its island and towed to the harvesting location and passed through a harvesting machine 21 for cutting the plant mass and transporting the plant mass from the bed to a processing location 22. The processing location is typically at a remote central location so that the crop is loaded onto trucks at a center 23 for shipping to the location 22. Suitable loading systems are provided for stacking the crop using conventional agricultural equipment.

The harvesting machine 21 includes a sickle knife 24 arranged on fixed platforms 25, 26 so that the floating bed passes underneath the knife between the platforms. The harvesting machine also includes a rotating reel 19 for pulling the crop mass into the machine and controlling its passage so that the bed is not broken up as the sickle knife cuts the material above the knife. The cut crop falls onto a conveyor 27 behind the knife 24 and from that conveyor is carried by an extended conveyor system 27A to the center 23.

As shown in FIG. 4 a part of the root mass is harvested by a knife 24A at the harvesting underneath the bed and is transported from the bed to the processing location 22 where a part of the harvested root mass is used for cuttings in a new bed as shown at 30 and a part can be used in the processing.

The harvesting machine is mounted on a fixed support defined by platforms 25, 26 anchored to the lake bottom in the lake for passing the floating bed past the machine. Alternatively the machine can float on a floatation system defining a channel for the beds to pass through. In this case the machine can be moved from place to place to harvest beds at their location with the beds being moved only a short distance to the harvesting machine. Yet further the beds may remain fixed and the machine moved to them.

The floating bed has a width in the range 10 feet to 30 feet and preferably 16 feet and a length of the order of 20 to 100 feet and preferably 48 feet so as to be maneuverable on the body of water. Thus for example the bed may be formed of separate sections which are 4 feet by 8 feet so that the sections can be easily managed and transported to the lake and the structure assembled at the lake to form the whole bed. As shown the 4×8 sections are connected into a bed of four sections wide and six sections long The individual sections are connected together and the peripheral float tube 5 added with the skirt 10.

As described above, each growth tray comprises a layer of foam 3 with cup shaped openings 3A for receiving individual plants with layers of reinforcing mesh above the foam layer.

Each growth tray comprises a plurality of plant carrying trays 2 shaped to fit into the openings 3A in the foam with each peat moss carrying tray being pre-germinated and applied onto the foam at installation on the body of water. Each plant carrying tray has the cups 2 thereof covered by a layer of a transparent film 2A which is slit after installation to allow plant growth. The transparent material acts as a greenhouse covering to encourage germination.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method for extraction of contaminating material from a body of water comprising:
    forming a floating bed on which terrestrial plants can be grown with their roots hanging into the body of water;
    locating the floating bed over an area where extraction of contaminating material from the body of water is required;
    growing the terrestrial plants so as to form a root mass in the water and an upstanding plant mass;
    growing the terrestrial plants to take up the contaminating material from the body of water;
    and harvesting the upstanding plant mass leaving at least part of the root mass to continue growing into a new season;
    wherein there is provided a step of agitating a bed of the body of water in the area of the floating bed to lift the contaminating material to the roots;
    wherein equipment used for agitation is positioned into the water from the floating bed which is arranged at a water surface such that the floating bed where the terrestrial plants are grown thereon is in spaced relation above the bed of the body of water which includes sediment containing contaminating material.

2. The method of claim 1 wherein the contaminating material is phosphate in lake water.

3. The method of claim 1 wherein the bed is agitated by aeration.

4. The method of claim 1 wherein the bed is agitated by pumping water.

5. The method of claim 1 wherein the bed is agitated by stirring the water.

6. The method of claim 1 wherein the floating bed has a skirt arranged around its periphery hanging from the water surface to a position at or adjacent the bed of the body of water.

7. The method of claim 1 wherein there is provided a power source carried on a support portion of the floating bed that powers the equipment for agitation locally at the location of the floating bed.

8. The method of claim 1 wherein a plurality of floating beds are connected together.

9. The method of claim 8 wherein the floating beds are connected together with a peripheral flotation element.

10. The method of claim 1 wherein the equipment used for agitation is depending from locations along a periphery of the floating bed.

11. The method of claim 1 wherein the floating bed comprises a plurality of growth trays connected together.

12. The method of claim 11 wherein each growth tray comprises a layer of foam with cup shaped openings for receiving individual plants.

13. The method of claim 12 wherein each growth tray includes a mesh above and/or below the foam layer received within a peripheral containing member.

14. The method of claim 11 wherein each growth tray comprises a plurality of plant carrying cups connected together into a tray with each cup shaped to fit into the openings in the foam.

15. The method of claim 14 wherein each plant carrying tray has the plants therein pre-germinated at a remote location with the tray being applied onto the foam layer during installation on the body of water.

16. The method of claim 14 wherein each plant carrying tray has the cups thereof covered by a layer of a transparent film.

17. The method of claim 16 wherein the transparent film is slit at a location of the respective cup to form an opening to allow plant growth through the transparent film while the transparent film remains arranged to encourage germination of the respective plant by greenhouse effect within the respective cup.

18. The method of claim 1 wherein the floating bed has a width in the range 10 feet to 30 feet so as to be maneuverable on the body of water.

* * * * *